United States Patent
Perkins

(10) Patent No.: US 11,712,976 B2
(45) Date of Patent: Aug. 1, 2023

(54) HYBRID ELECTRIC VEHICLE BATTERY LOCKOUT PLUG

(71) Applicant: TOYOTA MOTOR ENGINEERING & MANUFACTURING NORTH AMERICA, INC., Plano, TX (US)

(72) Inventor: Blair C. Perkins, Georgetown, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 41 days.

(21) Appl. No.: 17/377,760

(22) Filed: Jul. 16, 2021

(65) Prior Publication Data

US 2023/0018864 A1    Jan. 19, 2023

(51) Int. Cl.
*H01R 13/44*      (2006.01)
*B60L 53/16*      (2019.01)

(52) U.S. Cl.
CPC .............. *B60L 53/16* (2019.02); *H01R 13/44* (2013.01); *H01R 2201/26* (2013.01)

(58) Field of Classification Search
CPC .............. H01R 2201/26; H01R 13/639; H01R 13/6275; H01R 13/6397; H01R 13/629; H01R 13/6272; H01R 13/62933; H01R 13/62938
See application file for complete search history.

(56) References Cited

U.S. PATENT DOCUMENTS 5,864,106 A     1/1999   Hartwig
7,125,268 B1   10/2006   Marukawa
8,239,103 B2    8/2012   Ichihara
9,048,036 B2 *  6/2015   Kikuchi .................. H01H 9/26
9,160,127 B2   10/2015   Rule-Greet
(Continued)

FOREIGN PATENT DOCUMENTS

JP   2002175791 A    6/2002
JP   2011165477 A    8/2011
WO   2020159826 A1   8/2020

OTHER PUBLICATIONS

Domestic Plug Lockout; https://www.reecesafety.co.uk/plug-lockout.html; Feb. 19, 2021.

(Continued)

*Primary Examiner* — Truc T Nguyen
(74) *Attorney, Agent, or Firm* — Sheppard, Mullin, Richter & Hampton LLP; Hector A. Agdeppa; Daniel N. Yannuzzi

(57) ABSTRACT

A battery lockout device is provided. The battery lockout device may include a safety plug body adapted to engage a power port of the battery. The battery lockout device may further include a rotating member operatively connected to the safety plug body, the rotating member engaging a battery lip or battery lip housing. The rotating member, in a first rotated position, can be locked in the first rotated position preventing access to the power port of the battery and preventing removal of the safety body plug from the battery. To effectuate locking the rotating member in the first rotated position, a keyed lock can be used to maintain the first rotated position of the rotating member relative to the safety plug body and the battery/battery housing lip. In this way, no energy from the battery may be discharged until removal/disengagement of the battery lockout device.

10 Claims, 5 Drawing Sheets

(56) References Cited

U.S. PATENT DOCUMENTS

| | | | | |
|---|---|---|---|---|
| 9,260,080 | B2* | 2/2016 | Maguire | B60L 3/0046 |
| 9,847,610 | B2* | 12/2017 | Basoukeas | B60L 50/61 |
| 11,604,463 | B1* | 3/2023 | Trivedi | G05D 1/0217 |
| 2012/0234061 | A1* | 9/2012 | Inoue | H01R 13/6397 |
| | | | | 70/255 |
| 2014/0187071 | A1* | 7/2014 | Rule-Greet | H01R 33/95 |
| | | | | 439/304 |
| 2015/0162707 | A1* | 6/2015 | Yuasa | B60L 53/16 |
| | | | | 439/372 |
| 2019/0217731 | A1* | 7/2019 | Rönfanz | H01R 31/06 |
| 2020/0152950 | A1 | 5/2020 | Rodriguez | |
| 2021/0119389 | A1* | 4/2021 | Kropiewnicki | H01R 13/7038 |
| 2022/0032800 | A1* | 2/2022 | Naganishi | B60L 53/35 |
| 2022/0337117 | A1* | 10/2022 | Sasaki | H02K 1/16 |
| 2023/0091154 | A1* | 3/2023 | Gao | H01M 10/48 |

OTHER PUBLICATIONS

Lockout tagout devices for safe maintenance activities; https://www.totallockout.com/lockout-store/electrical-lockout/pluglockouts/plug-connection-lockout/; Feb. 19, 2021.

* cited by examiner

HYBRID ELECTRIC VEHICLE BATTERY LOCKOUT PLUG

TECHNICAL FIELD

The present disclosure relates generally to hybrid electric vehicles (HEVs), and in particular, some implementations may relate to a lock out plug used with a battery casing assembly of an HEV (or EV), e.g., during servicing of the HEV/EV.

DESCRIPTION OF RELATED ART

When servicing HEVs, a device, commonly referred to as a safety plug, may be installed into a power port of a battery that provides power to the HEV/for HEV operation. Such a safety plug acts as a safety disconnect switch that, when installed, cuts off high voltage from the rest of the vehicle system(s) beyond the battery/battery pack.

BRIEF SUMMARY OF THE DISCLOSURE

In accordance with one embodiment, a device may comprise a safety plug body adapted to engage a power port of a battery and prevent discharge of energy stored in the battery. The device may further comprise a locking element movably attached to the safety plug body adapted to prevent removal of the safety plug body from the power port of the battery.

In some embodiments, the locking element rotates relative to the safety plug body.

In some embodiments, the device accepts a lock through respective apertures of the safety plug body and the locking element, the respective apertures lining up with one another when the locking element in a first rotated position.

In some embodiments, the locking element comprises an engagement member at an end of the locking element distal from its respective aperture.

In some embodiments, the engagement member engages a lip of the battery or a lip of a housing for the battery, preventing the removal of the safety plug body.

In accordance with another embodiment, a lockout plug assembly may comprise a first member comprising a battery port connector of a battery, and a second member comprising a locking jaw, the locking jaw accepting a lock when rotated in a first direction, and engaging a battery housing preventing removal of the lockout plug assembly from the battery.

In some embodiments, the first and second members are rotatably connected with a connecting member passing through respective connection apertures of the first and second members.

In some embodiments, the respective lock apertures coincide when rotated in the first direction, and wherein the lock passes through both the first and second members via the respective lock apertures.

In some embodiments, the respective lock apertures are position at first ends of the first and second members distal from second ends of the first and second members, the second end of the second member comprising the locking jaw.

In some embodiments, the locking jaw disengages the battery housing when rotated in a second direction.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
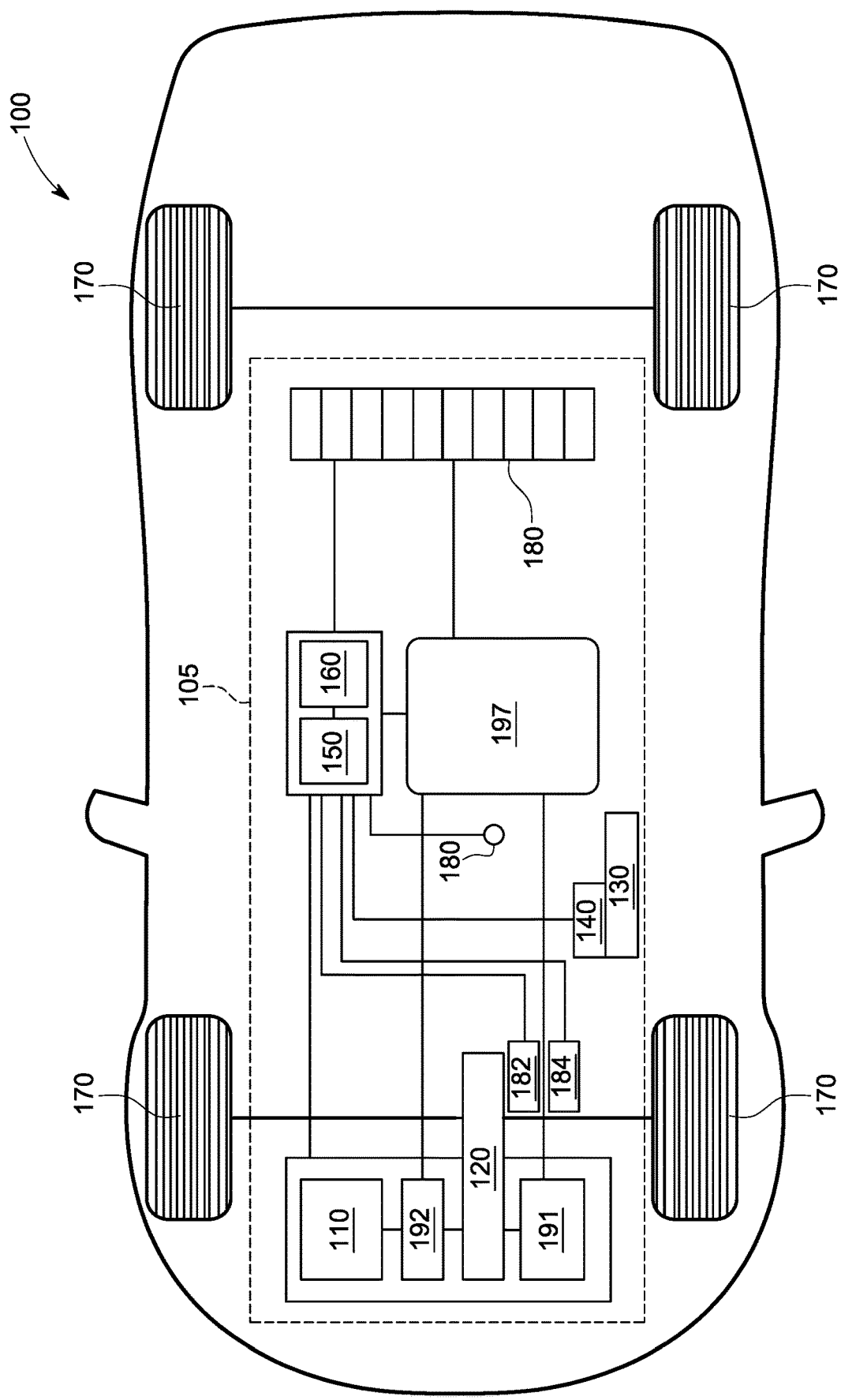
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

As alluded to above, devices may be used to cut off high voltage from reaching the HEV from the battery while the HEV is being serviced. Various embodiments are directed to a lockout plug assembly It should be noted that although embodiments described herein are provided in the context of HEVs/EVs and HEV/EV batteries, embodiments may be used with/for or adapted to be used/for any battery (typically, high voltage battery) that requires interruption of a power source(s) for the battery, i.e., cutting off a current path from the battery.

In operation, a user, e.g., service person may unplug a vehicle's power cable from a battery. The battery lockout plug assembly may be opened, where the battery lockout plug assembly has a hinged jaw that can rotate to effectuate battery engagement and to accommodate a lock, such as a keyed padlock. In some embodiments, the battery lockout plug assembly's hinged jaw can rotate in a downward direction, and the lockout plug can be inserted into a power port of the battery. The battery lockout plug assembly's hinged jaw may be rotated in the opposite direction, in this example, back upward, to close the battery lockout plug. In some embodiments, the one or more areas of the hinged jaw may engage a flange(s) of a battery plug to prevent the battery lockout plug assembly's removal. The aforementioned lock/padlock can be engaged through the battery plug's hasp/lock, thereby preventing the hinged jaw from moving/rotating, thus locking out power from the battery, which in turn locks out the vehicle (prevents the vehicle from being operated/turned on). Unlocking can be performed by generally reversing the order of the aforementioned steps/operations.

That is, a lockout device, in this case, the battery lockout plug assembly, can effectively "separate" the vehicle from its battery, preventing operation of the vehicle. By adding a mechanism to accept a lock, e.g., keyed lock, the battery lockout plug assembly is controllable by the lock owner. It should be understood that in the context of various embodiments, the battery and vehicle are locked out from each other, but the battery may still have stored energy.

The operation of HEVs/EVs typically require voltages that are relatively higher than that associated with standard vehicles. Because of this characteristic of HEV/EVss, the amount of circuitry to which high voltage/current may be applied can be large. When servicing HEVs/EVs, lockout plugs are typically used to cut the current path from the battery. In this way, the HEV or EV can be prevented from being operated or energized during repairs, when some issue/event is being investigated, etc.

Safety plugs are typically plugged into/installed into the power port of a battery or battery pack. However, conventional safety plugs do not have the ability to be locked, e.g., with a keyed lock, such as a padlock, or other type of secure locking mechanism or device. Accordingly, various embodiments are directed to a lockout plug that operates to cut a vehicle off from a battery/battery pack f, while being able to be locked to the battery/battery pack. In particular, a lockout plug configured in accordance with some embodiments includes a plug to connect to the battery/battery pack, as well as a movable/actuating jaw (such as a hinged jaw) with a lid latch and hasp. The jaw can be actuated/moved to engage the lid latch with the latch of a battery/battery pack housing or casing, while the hasp allows the lock out plug to be locked with a padlock or similar locking device.

Because various embodiments are able to be locked, use of the contemplated lock out plug allows for compliance with "lockout tagout" standards or procedures. Lockout tagout standards/procedures are followed to ensure that certain equipment/machinery is shut down, and made to be inoperable while that equipment/machinery is being serviced or undergoing some sort of maintenance or work. For example, the Occupational Safety and Health Administration (OSHA) lockout tagout standard requires that employers establish procedures for removing the energy source(s) from machines, and putting appropriate devices (such as the disclosed lockout plug) on the machines to prevent unexpected startup or re-energization.

The systems and methods disclosed herein may be implemented with or by any of a number of different vehicles and vehicle types. For example, the systems and methods disclosed herein may be used with automobiles, trucks, motorcycles, recreational vehicles, farm vehicles, and other like on- or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed ($N_E$) of engine 110 independently of the vehicle speed (V).

ECU 150 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG191. It should be understood that in embodiments where MG191 and MG192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG 191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
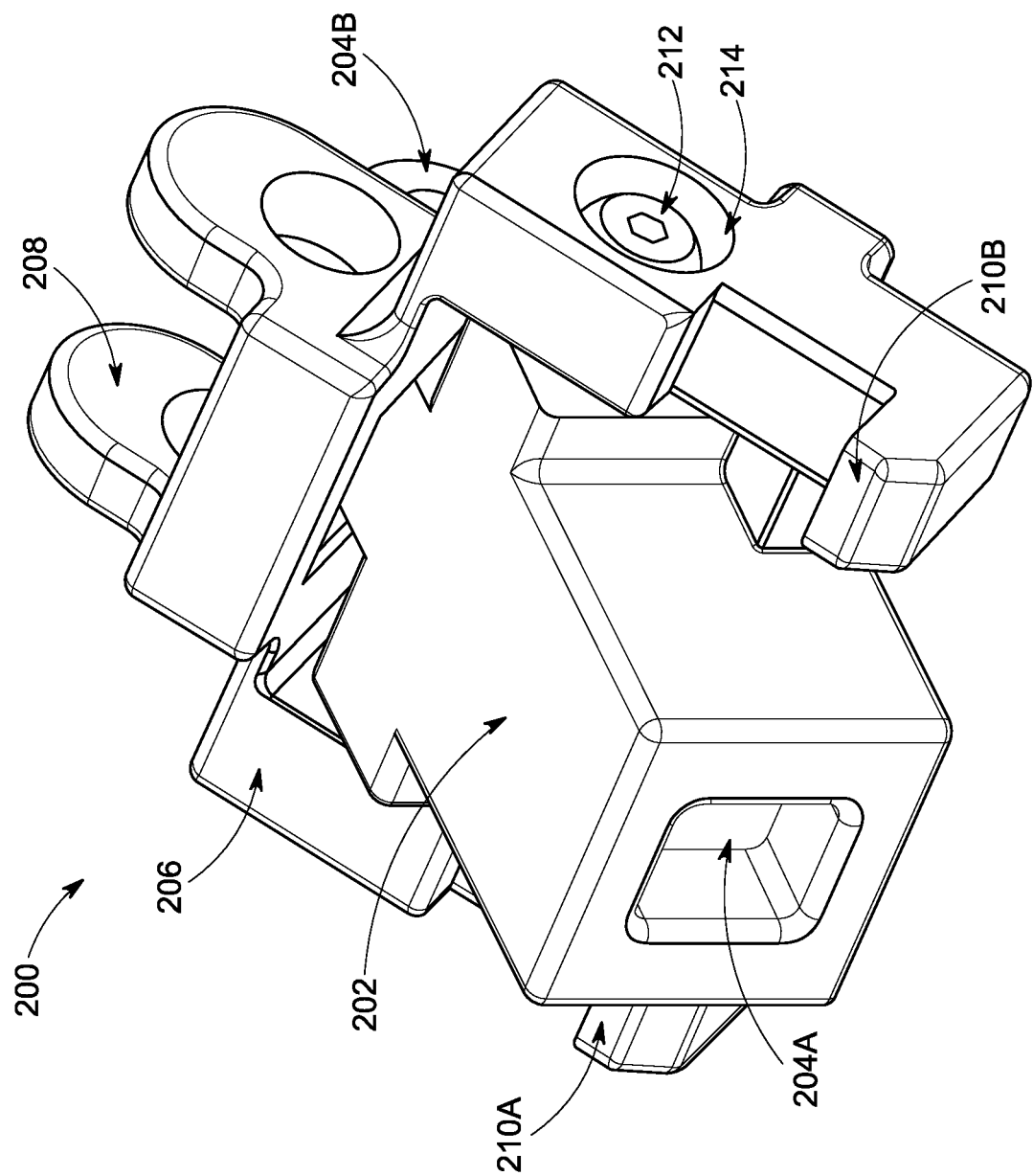
FIG. 2 is a perspective view of an example lockout plug assembly in an "open" state in accordance with some embodiments.

FIG. 2 is a perspective view of an example lockout plug assembly 200 in accordance with one embodiment of the present disclosure. The lockout plug assembly 200 may include the safety plug/plug body 202 itself, which may comprise a plug connector 204A, and a plug lock connector 204B. The shape of safety plug 202 may vary, and the illustrated shape is merely a non-limiting example. Plug connector 204A may comprise a female or receiving port that can be used to operationally connect safety plug 202 to the battery/battery pack.

Lockout plug assembly 200 may further include a jaw 206 that in some embodiments, may be operatively connected to safety plug 202 at an area or position between the plug connector 204A and the lock connector 204B. Jaw 206 may, in one embodiment, be substantially "U-shaped" with opposite arms making up lip latches 210A and 210B on either side of safety plug 202. Jaw 206 may be operatively connected to safety plug 202 via a bolt 212 (or screw or other like element) that can pass through a corresponding aperture 214 of jaw 206 and an aperture of safety plug 202 (not shown). For example, jaw 206 may be rotatably connected to safety plug 202. In this way, jaw 206 may be actuated such that it rotates about the bolt 212 to/from an "open" state or position and a "closed" state or position.

Figure 3:
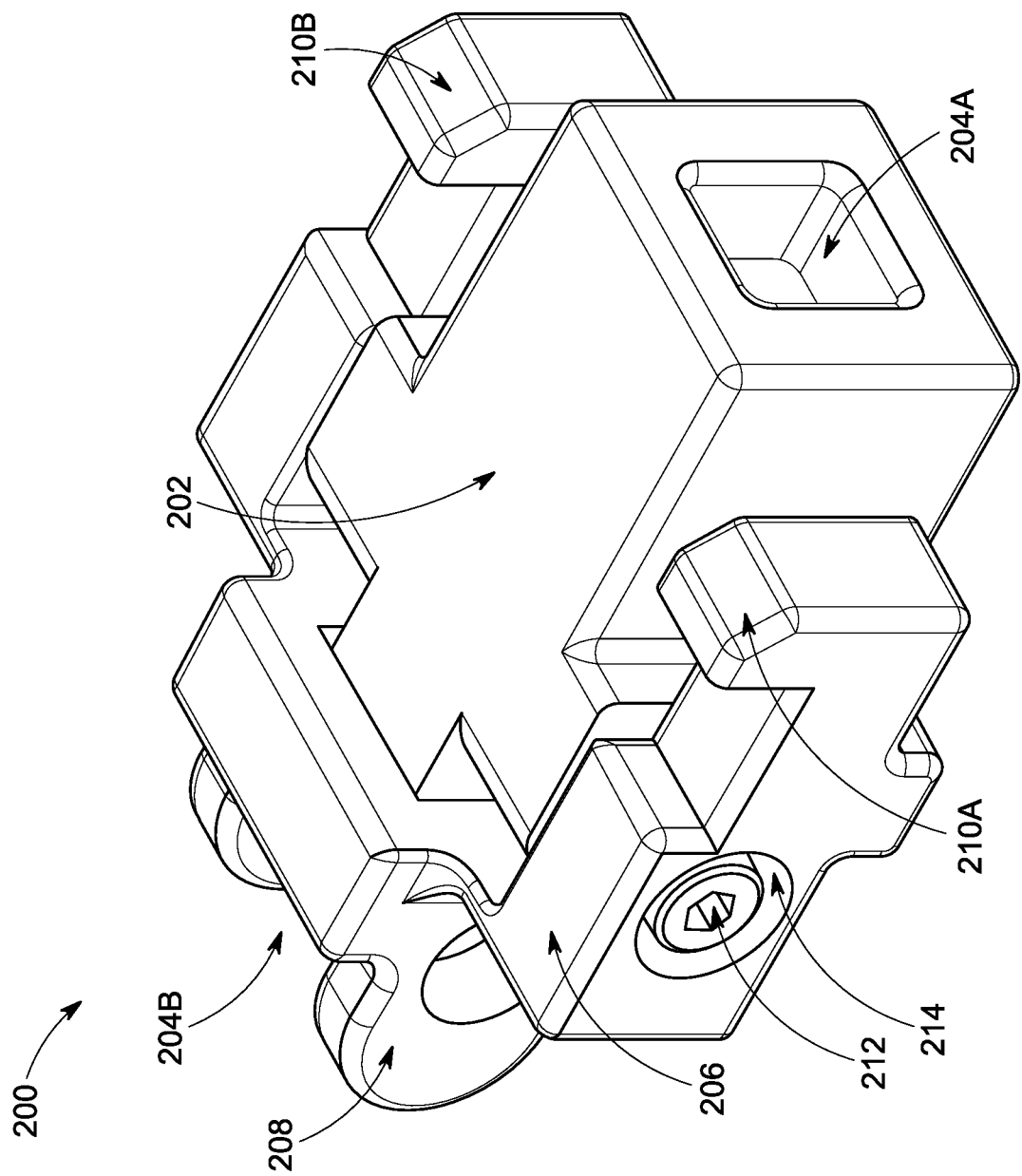
FIG. 3 is a perspective view of the example lockout plug assembly of FIG. 2 in a "closed" state in accordance with some embodiments.

FIG. 3 illustrates the lockout plug assembly 200 in the aforementioned closed state. In this closed state, lip latches 210A and 210B are parallel to opposite sides of safety plug 202 along the length of safety plug 202. As will be described in greater detail below, lip latches 210A and 210B may engage the underside of a lip implemented on a battery/battery pack casing or housing. In some embodiments, a spring or similar mechanism (not shown) may engage screw 212 (or aperture 214) to make jaw 206 spring-loaded, allowing jaw 206 to rest or be biased in some default position (either the open or closed position, or some other intermediate position) depending on how the spring mechanism is implemented.

Various materials can be used to construct lockout plug assembly 200 (or the component parts thereof, i.e., safety plug 202 and jaw 206). In some embodiments, the same material(s) can be used for both safety plug 202 and jaw 206. In some embodiments, the material(s) used to construct safety plug 202 and jaw 206 may differ. For example, in one embodiment, safety plug 202 may comprise one or some combination of the following materials, nylon, delrin acetal, high density polyethylene (HDPE) ultra high molecular weight PE (UHMW), polyvinyl chloride (PVC), polyeherimide (PEI), polylactic acid (PLA), acrylonitrile butadiene styrene (ABS), and so on. This list is not meant to be limiting.

Figure 4A:
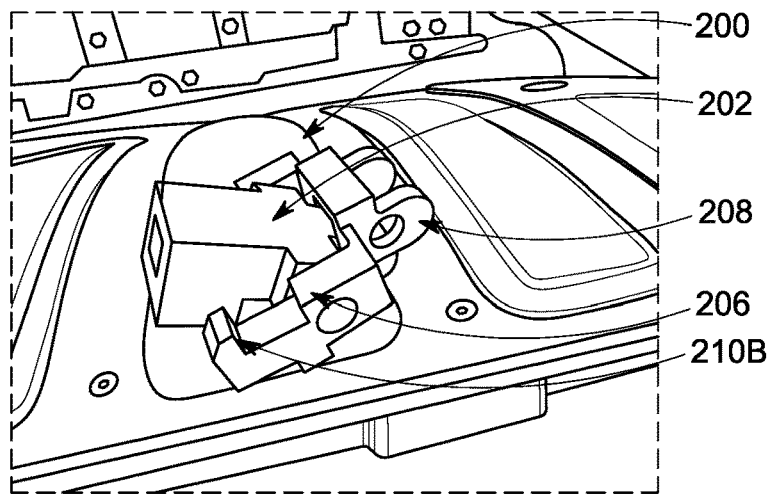
FIGS. 4A-4C illustrate example manipulation of the example lockout plug assembly of FIG. 2 from an open to closed state.
Figure 4B:
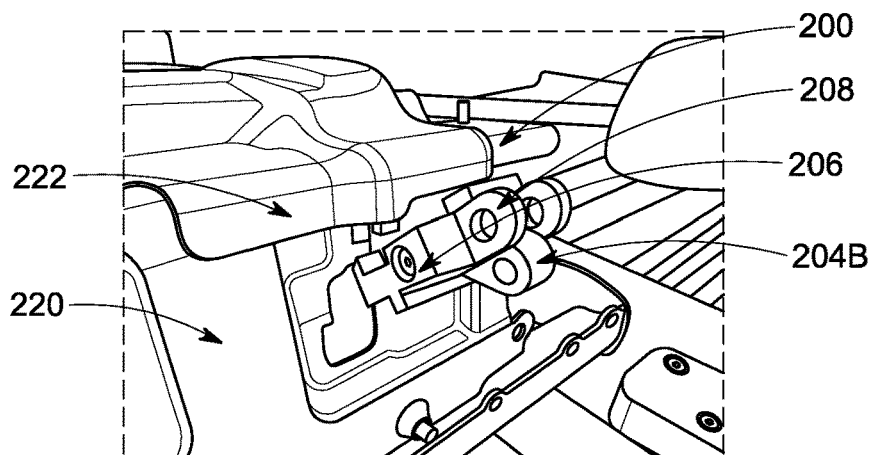
Figure 4C:
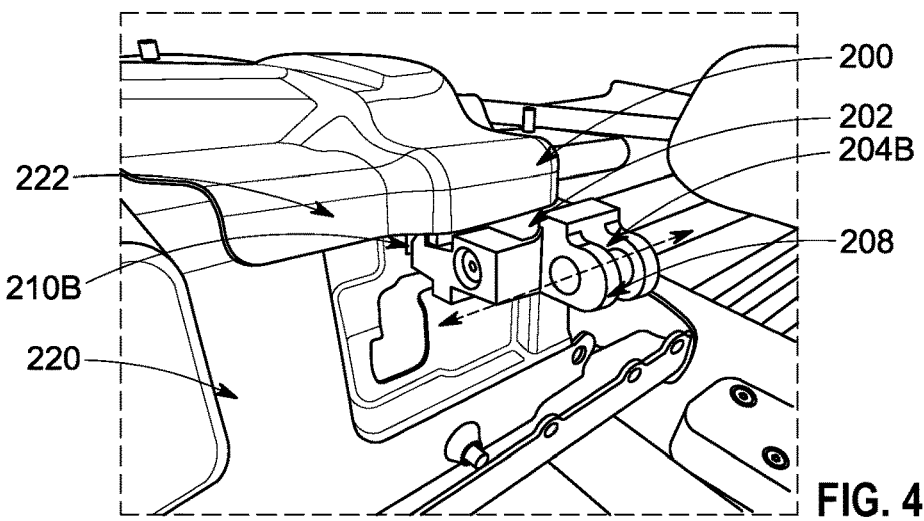

FIGS. 4A-4C will be described in conjunction with one another, as FIGS. 4A-4C illustrate various stages or positions that lockout plug assembly 200 may embody. FIG. 4A illustrates lockout plug assembly 200 in an open position, whereby jaw 206/lip latches 210A and 210B are not aligned. FIG. 4B illustrates lockout plug assembly 200 attached to the power port of a battery or battery pack enclosed by a battery casing or housing 220. Battery casing 200 may further include a lip 222 that can be part of a lid or other covering of battery casing 200. In operation, a user may rotate jaw 206 about the axis of connection (screw 212/aperture 214) to safety plug 202. It can be appreciated that the rotation of jaw 206 in one direction aligns the lip latches 210A and 210B of jaw 206 with the longitudinal sides of safety plug 202. As illustrated in FIG. 4C, once fully aligned and in the closed position, lip latches 210A and 210B of jaw 206 are aligned with the longitudinal sides of safety plug 202. As a result, lip latches 210A and 210B engage or mate with the underside of lip 222 of battery casing 220, and the respective apertures of the plug connector 204A and the lock connector 204B also align with one another (identified by arrow 230). In this way, battery casing 220 and lockout plug assembly 200 may interlock.

Figure 5:
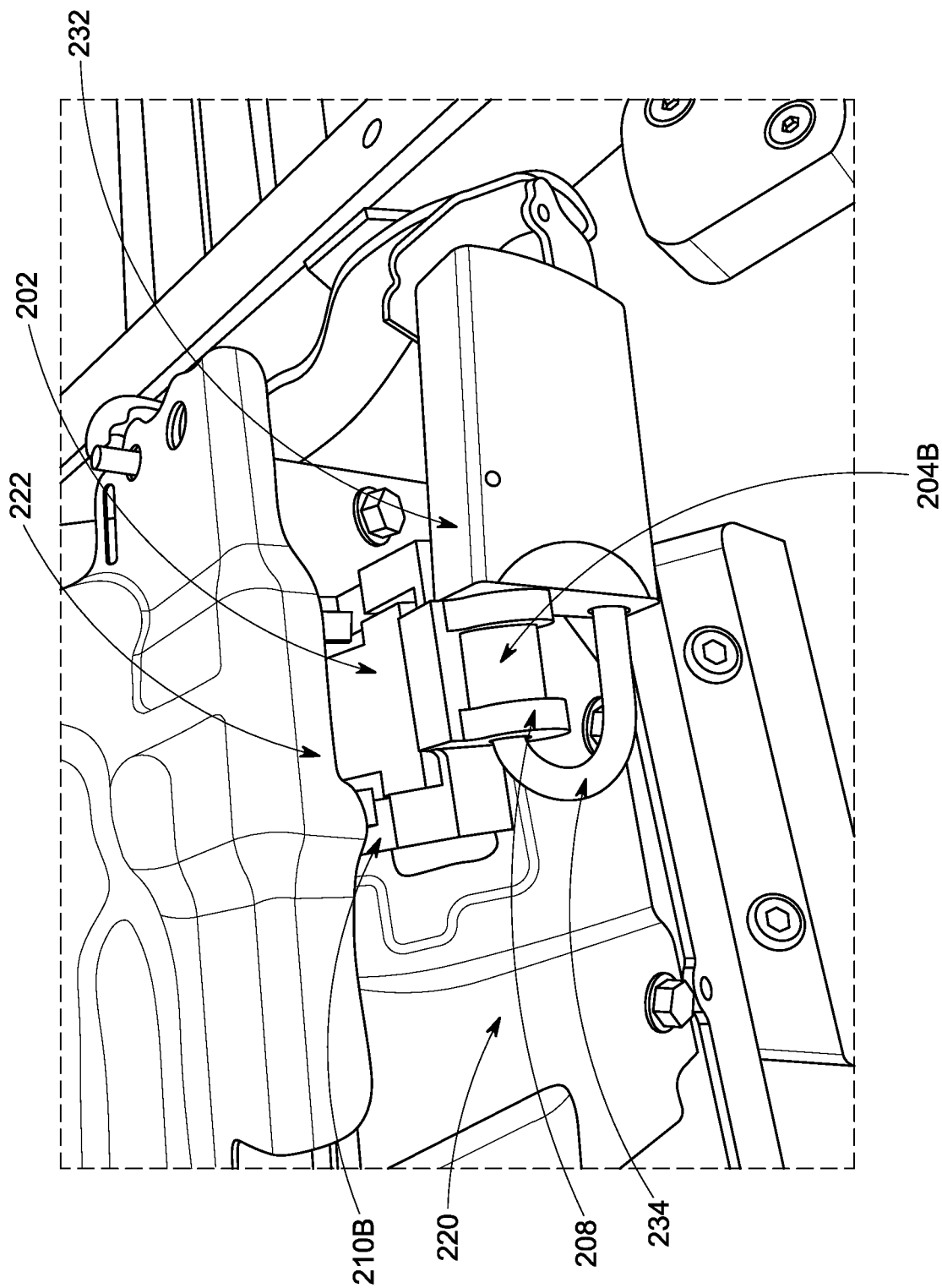
FIG. 5 illustrates example lockout plug assembly of FIG. 2 in a locked state.

Referring now to FIG. 5, a lock, e.g., keyed padlock 232 may be used to lock safety plug 202 and jaw 206 in the closed position (FIG. 4C). In one embodiment, and as illustrated in FIG. 5, the shackle or shank 234 of keyed padlock 232 may be routed through the respective apertures of plug connector 204B and jaw connector 208. Once keyed padlock 232 is locked, lockout plug assembly 200 cannot be reasonably removed or disengaged from battery casing 202. Moreover, due to the engagement of lip latches 210A and 210B with lid 222, lid 222 is also prevented from being lifted/opened. Accordingly, lockout plug assembly 200 may be used to meet the lockout tagout standards/procedures with regard to battery/HEV servicing.

As noted above, embodiments described and illustrated herein are merely examples, and not meant to be limiting. For example, the particular shape(s), size(s), positioning of the various aspects of lockout plug assembly 200 can vary, e.g., there may be only a single lip latch on either side of safety plug 202, or a single lip latch may be implemented such that engagement is effectuated at substantially the center/midpoint of safety plug 202. In some embodiments, the battery casing may comprise a different lid configuration, in which case lockout plug assembly 200 may be appropriately adapted to engage with that particular lid configuration, so long as lockout plug assembly 200 can be kept in place or in such a way that it cannot be removed absent unlocking lockout plug assembly 200.

Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common s elements. Such a description shall not require or imply that separate components are used to implement such features or functionality.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A device, comprising:
    a safety plug body adapted to engage a power port of a battery and prevent discharge of energy stored in the battery; and
    a locking element movably attached to the safety plug body to rotate about an axis perpendicular to a length of the safety plug body, adapted to prevent removal of the safety plug body from the power port of the battery.

2. The device of claim 1, wherein the device accepts a lock through respective apertures of the safety plug body and the locking element, the respective apertures lining up with one another when the locking element in a first rotated position.

3. The device of claim 2, wherein the locking element comprises an engagement member at an end of the locking element distal from its respective aperture.

4. The device of claim 3, wherein the engagement member engages a lip of the battery or a lip of a housing for the battery, preventing the removal of the safety plug body.

5. A lockout plug assembly, comprising:
    a first member comprising a battery port connector of a battery; and
    a second member comprising a locking jaw, the locking jaw accepting a lock when rotated in a first direction about an axis perpendicular to and through a length of the first member, and engaging a battery housing preventing removal of the lockout plug assembly from the battery.

6. The lockout plug assembly of claim 5, wherein the first and second members are rotatably connected with a connecting member passing through respective connection apertures of the first and second members.

7. The lockout plug assembly of claim 6, wherein respective lock apertures coincide when rotated in the first direction, and wherein the lock passes through both the first and second members via the respective lock apertures.

8. The lockout plug assembly of claim 7, wherein the respective lock apertures are position at first ends of the first and second members distal from second ends of the first and second members, the second end of the second member comprising the locking jaw.

9. The lockout plug assembly of claim 5, wherein the locking jaw disengages the battery housing when rotated in a second direction.

10. The device of claim 1, wherein the locking element comprises a lip latch to align with the longitudinal sides of the safety plug body.

\* \* \* \* \*